United States Patent
Scharf et al.

(10) Patent No.: US 8,555,780 B2
(45) Date of Patent: Oct. 15, 2013

(54) BALE PRESS

(75) Inventors: Thorsten Scharf, Orscholz (DE); Ulrich Hesselmann, Perl (DE)

(73) Assignee: Usines Claas France S.A.S., Metz (FR)

( * ) Notice: Subject to any disclaimer, the term of this patent is extended or adjusted under 35 U.S.C. 154(b) by 0 days.

(21) Appl. No.: 13/597,888

(22) Filed: Aug. 29, 2012

(65) Prior Publication Data

US 2013/0055910 A1 Mar. 7, 2013

(30) Foreign Application Priority Data

Sep. 1, 2011 (EP) ..................................... 11007101

(51) Int. Cl.
*B65B 13/26* (2006.01)
*A01F 15/14* (2006.01)

(52) U.S. Cl.
CPC .................................... *A01F 15/145* (2013.01)
USPC ..................... 100/33 R; 100/3; 100/21; 289/2

(58) Field of Classification Search
USPC .......... 100/4, 8, 17–24, 33 R, 3; 289/2, 6, 11, 289/13, 14; 56/341, 343
See application file for complete search history.

(56) References Cited

U.S. PATENT DOCUMENTS

| | | | | |
|---|---|---|---|---|
| 3,101,963 A | * | 8/1963 | Sullivan et al. | 289/11 |
| 4,765,235 A | * | 8/1988 | Schrag et al. | 100/3 |
| 4,993,317 A | * | 2/1991 | Collot et al. | 100/4 |
| 5,347,920 A | * | 9/1994 | Vansteelant et al. | 100/4 |
| 5,855,166 A | * | 1/1999 | McPherson | 100/3 |
| 7,398,727 B2 | * | 7/2008 | Wright | 100/6 |
| 7,600,470 B2 | * | 10/2009 | Eylenbosch | 100/33 R |

FOREIGN PATENT DOCUMENTS

EP 2 198 687 6/2010

* cited by examiner

*Primary Examiner* — Jimmy T Nguyen
(74) *Attorney, Agent, or Firm* — Michael J. Striker

(57) ABSTRACT

A bale press includes a pressing channel in which a piston is displaceable for forming a bale from crop material supplied to the pressing channel. The bale press includes a yarn supply and a knotter device arranged at a side of the pressing channel. The knotter device has a first holder for releasably holding an end portion of a yarn, a yarn deflecting member and a knotter beak. The yarn extends between the first holder and the yarn supply across the deflecting member and a side of the bale facing away from the piston. The knotter beak ties a knot in a first stretch of the yarn extending between the first holder and the deflecting member. A second holder holds the yarn at the deflecting member in an initial phase of bale formation.

5 Claims, 3 Drawing Sheets

BALE PRESS

CROSS-REFERENCE TO A RELATED APPLICATION

The invention described and claimed hereinbelow is also described in European Patent Application EP 11007101.6 filed on Sep. 1, 2011. This European Patent Application, subject matter of which is incorporated herein by reference, provides the basis for a claim of priority of invention under 35 U.S.C. 119(a)-(d).

BACKGROUND OF THE INVENTION

The invention relates a bale press, in particular a square bale press, in which crop material is pressed into a cuboid bale by a piston which is reciprocating in a pressing channel. In order to prevent the bales from disintegrating when ejected from the pressing channel, a yarn is tied around the bales and knotted.

Knotter devices used to wrap bales of crop material are known. For example, EP 2198687 A1 discloses a conventional knotter device that ties yarn around pressed bales of crop material.

Such conventional knotter device comprises a first holder, also referred to as a clamping disk, for releasably holding an end portion of the yarn, a deflecting member or horn around which the yarn is bent, and a knotter beak. The knotter beak ties a knot which connects a first stretch of the yarn extending between the first holder and the deflecting member to a second stretch of yarn which is introduced into the knotter device by a reciprocating needle from across the pressing channel.

When a process of forming/wrapping a particular bale is finished and formation of a new bale is about to begin, the yarn to be wrapped around the new bale extends straight through the pressing channel. When the bale grows, it displaces the yarn in a downstream direction of the channel. Consequently, an intermediate portion is formed which extends in the longitudinal direction of the channel between the first stretch of the yarn extending between the first holder and the deflecting member and a portion of the yarn which extends straight through the pressing channel at a side of the new bale opposite to the piston.

Since one end of the yarn is firmly held by the clamping disk, the length of the intermediate portion can increase only due to yarn which is slips around the bale under formation whenever the bale is pushed down the pressing channel by the strokes of the piston. Since friction at the flanks of the bale increases with the length of the bale, the tension to which the yarn is subjected can become quite high when the bale is nearly finished. Consequently, in many balers of the prior art, the yarn was likely to snap or to slip from the clamping disk at that stage, particularly when the bale is nearly finished.

Various solutions have been proposed for controlling the tension of the yarn, in order to prevent it from snapping or slipping during the bale wrapping process. Typically with these known proposed solutions, even where the tension of the yarn could be safely maintained below its rated tensile strength, snapping could still not be avoided completely, i.e., in every situation.

SUMMARY OF THE INVENTION

The present invention overcomes the shortcomings of known arts, such as those mentioned above.

To that end, the present invention provides a bale press in which the risk of the yarn snapping is reduced still further than any known bale presses.

In an embodiment, the invention provides a bale press having a pressing channel in which a piston is displaceable for forming a bale from crop material supplied to the pressing channel, a yarn supply and a knotter device arranged at a side of the pressing channel. The knotter device comprises a first holder for releasably holding an end portion of the yarn, a yarn deflecting member and a knotter beak. During operation, the yarn extends between the first holder and the yarn supply across the deflecting member and across a side of the bale facing away from the piston and the knotter beak is arranged to tie a knot in a first stretch of the yarn extending between the first holder and the deflecting member. A second holder is arranged to hold the yarn at the deflecting member at least in an initial phase of bale formation.

The invention is premised upon the fact that at the beginning of bale formation, when the accumulated crop material of the bale forms only a rather thin layer extending through the pressing channel, the layer is likely to disintegrate completely when it is no longer subject to pressure from the piston. As such, the yarn extending around it relaxes to such an extent that is no longer in contact with the deflecting member. A subsequent stroke of the piston will then send the yarn hitting violently against the deflecting member, so that by a sharp increase in yarn tension resulting in some fibers of the yarn being damaged. If this happens repeatedly, the yarn will snap even if its tension is below its rated tensile strength.

By providing a second holder which prevents the yarn form losing contact with the deflecting member while the bale is not subject to pressure from the piston, the present invention prevents yarn from violently hitting the deflecting member so that damage to the yarn that would reduce its tensile strength is avoided.

The second holder need not hold the yarn as tightly as the first holder does. Therefore, a slot having two flanks between which the yarn is held by friction can be effectively implemented as the second holder. However, such a slot is effective only if the yarn has an appropriate thickness. Therefore, it is preferred that the second holder comprises a pressing finger which, in a first position, presses the yarn against an abutment and in a second position is spaced apart from the yarn and the deflecting member. The abutment is preferably the deflecting member itself. Thus, while the pressing finger is in the first position, the yarn is clamped, and contact with the deflecting member is maintained even if the tension of the yarn temporarily drops to zero.

Between the deflecting member and an edge of the side of the bale facing away from the piston, the yarn extends in a straight line, at least while the bale is subject to pressure from the piston.

As discussed, conventional bale presses are known to comprise a needle which is displaceable across the pressing channel in order to introduce into the knotter device a second stretch of yarn for knotting to the first stretch by the knotter beak. in such a bale press, the pressing finger generally is arranged to release the first stretch of yarn prior to the introduction of the second stretch into the knotter device, and to urge both the first and the second stretch towards the deflecting member in order to be seized and tied by the knotter beak, after introduction of the second stretch.

In the invention as claimed, the pressing finger is put to a double use. In other words, the pressing finger that is conventionally used for manipulating the second stretch of yarn during knot formation is used in the invention for protecting the yarn from damage by the piston in an initial phase of bale formation. This double use of the pressing finger allows the present invention to be implemented at negligible cost, since no extra components are required, but only the way in which existing components are driven is modified.

The knotter device comprises a base plate facing the pressing channel. A slot formed in the base plate has a first portion through which the yarn extends from the deflecting member to the side of the bale facing away from the piston, and a second portion for receiving the reciprocating needle and the second stretch of yarn. A retainer projection extends into the slot between its first and second portion, in order to prevent the first stretch of yarn from leaving the first portion when the pressing finger is moved away from the deflecting member and the first stretch of yarn in order to able to seize the second stretch.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
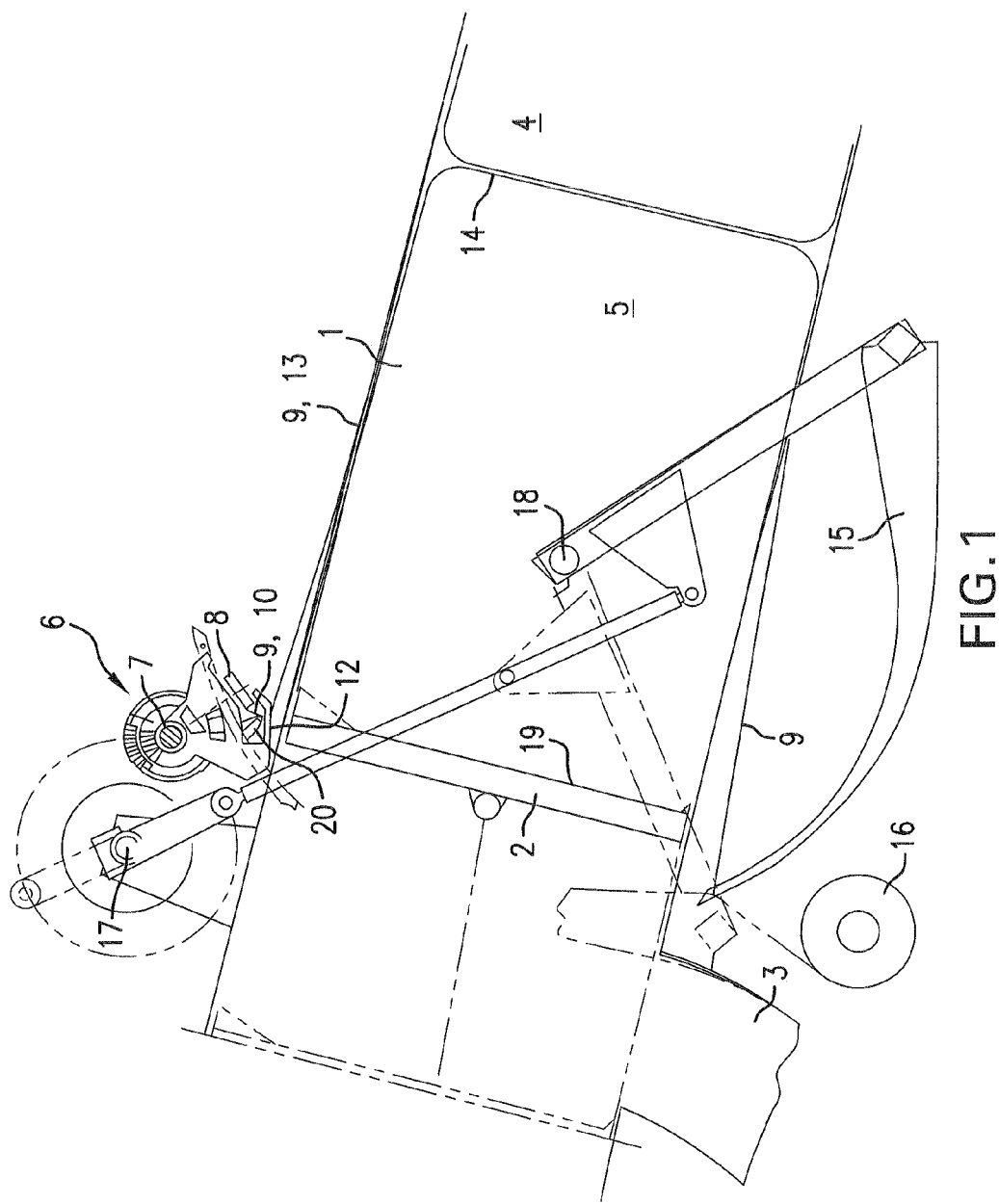
FIG. 1 is a schematic cross section of a pressing channel of a square baler.

FIG. 1 is a side view of a pressing channel 1 of square baler. A piston 2 is reciprocating movable across a feed opening 3 formed in a bottom wall of a pressing channel 1, through which freshly harvested crop material is continuously introduced into pressing channel 1. In the course of many strokes, the piston 2 forms a new bale 5 by compacting the crop material against a finished bale 4.

A knotter device 6 driven by a knotter shaft 7 is installed at an upper wall of pressing channel 1. The knotter device 6 comprises a clamping disk 8 in which an end portion of binding yarn 9 is firmly held, and a baseplate 12 which faces pressing channel 1. A first stretch 10 of the binding yarn 9 extends from clamping disk 8 to a hook 11 (not shown in FIG. 1), which is mounted adjacent to a slot in the baseplate 12. In FIG. 1, which illustrates a stage in which new bale 5 is nearly finished, the binding yarn 9 is sharply bent at hook 11, and an intermediate portion 13 of the binding yarn 9 extends from the hook 11 in the longitudinal direction of pressing channel 1 to a rear side 14 of new bale 5. The binding yarn 9 further extends across rear side 14, towards the tip of a binding needle 15, and from there to a yarn supply bobbin 16.

When the new bale 5 has reached a predetermined length, binding needle 15 is coupled to a rotating layshaft 17, in order to pivot clockwise around axis 18. This causes a second stretch of yarn to be unwound from supply bobbin 16, drawn through a space which at that time exists between a front side 19 of bale 5 and the piston 2, and introduced into knotter device 6.

Within knotter device 6, a knotter beak 20 seizes the first stretch 10 and one strand of the newly introduced stretch, and joins them by a knot, while another strand of said second stretch is being clamped by damping disk 8, to be used for the next bale.

Figure 2:
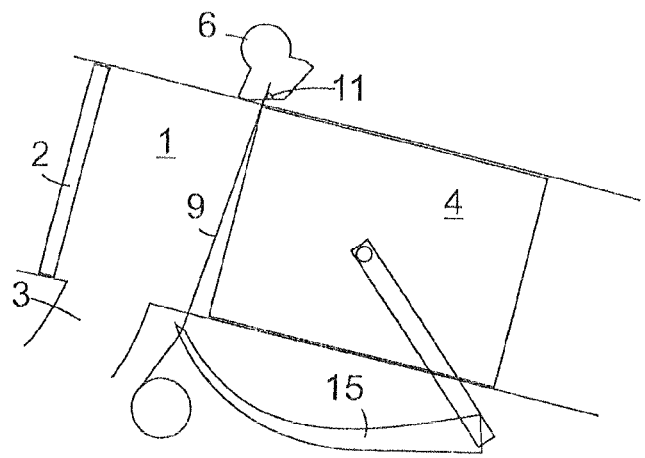
FIGS. 2 to 4 are schematic cross section views illustrating an initial stage of bale formation in the baler of FIG. 1.

The operation of the knotter beak 20 is known in the art and, therefore, is not described in detail herein. What is relevant for the present invention, however, is the beginning of the formation of a new bale. FIG. 2 illustrates in a simplified cross section the state of the pressing channel 1, the knotter device 6 and the binding needle 15 immediately after a knot is tied around finished bale 4. in this case, the tip of binding needle 15 has withdrawn below the pressing channel 1, and the binding yarn 9, having its end clamped in clamping disk 8, extends across hook 11 (see FIG. 2), and straight through pressing channel 1 from knotter device 6 to the tip of binding needle 15.

Figure 3:
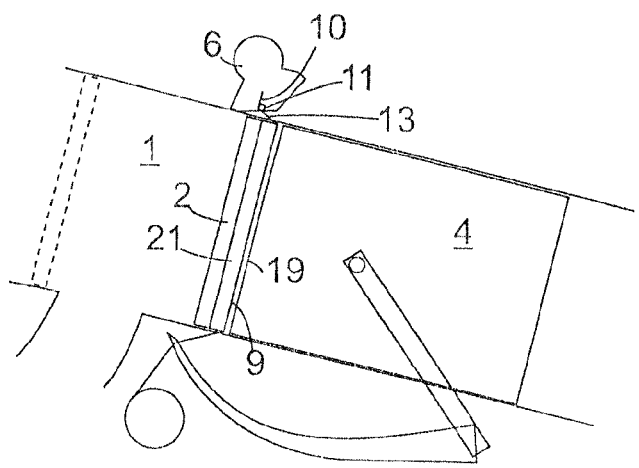

In subsequent strokes of piston 2, newly introduced crop material is pressed against the front side 19 of finished bale 4, whereby a layer 21 of compacted crop material is formed and the yarn 9 is displaced in the downstream direction of pressing channel 1, as seen in FIG. 3.

Figure 4:
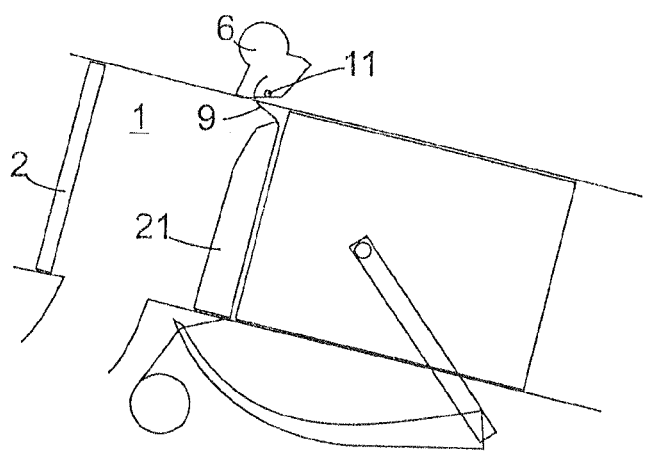

At the beginning of bale formation, the layer 21 is thin, and the crop material in it tends to re-expand and to crumble when the piston 2 is withdrawn. The yarn 9 slackens, and in a conventional baler it may come apart from hook 11, as shown in FIG. 4. When the piston 2 strikes again, the yarn 9 hits against the hook 11, and the intermediate portion 13 is temporarily subject to high, potentially damaging tension.

Figure 5:
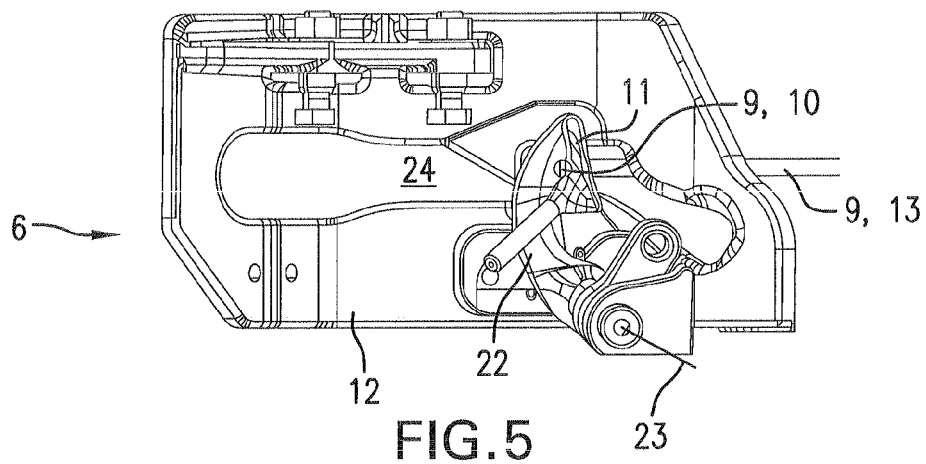
FIG. 5 is a plan view of a base plate of a knotter device of the baler in an initial stage of bale formation.
Figure 6:
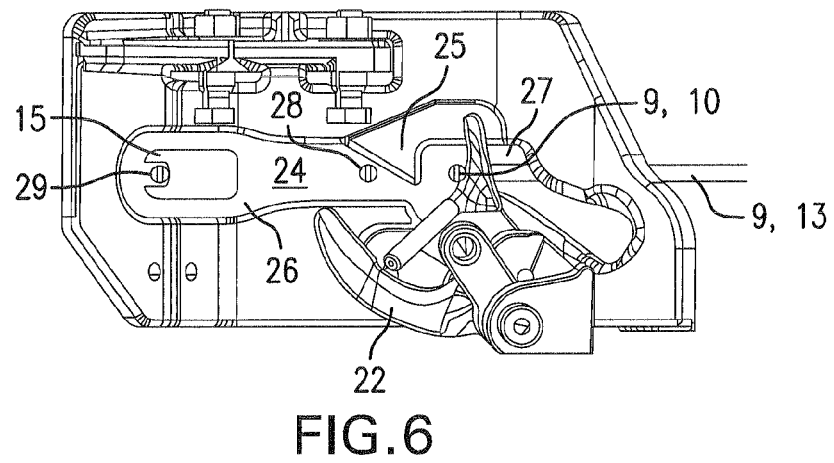
FIG. 6 is a plan view of the base plate in a stage in which formation of the bale is finished and the yarn is being wrapped around the bale.
Figure 7:
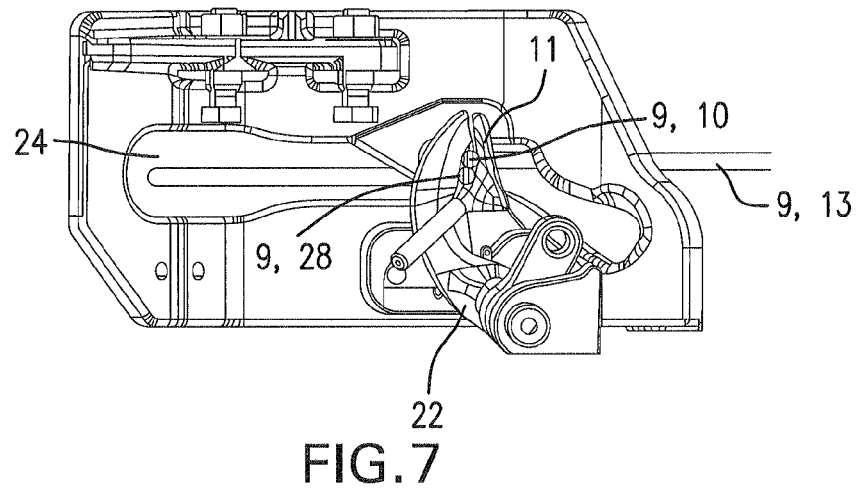
FIG. 7 is a plan view of the base plate during knot formation.

According to the present invention, as shown in FIGS. 5 to 7, a pressing finger 22 is mounted to the baseplate 12 of knotter device 6, which pressing finger is rotatable about an axis 23 substantially perpendicular to base plate 12 between positions shown in FIGS. 5 and 6, respectively.

In the position of FIG. 5, pressing finger 22 presses yarn 9 tightly against hook 11 immediately after a knot has been formed and formation of a new bale is beginning. Since the yarn 9 is thus firmly held against hook 11, it cannot be smashed against the hook 11 by piston 2, and damage to the yarn 9 is avoided. The above-mentioned intermediate portion 13 extends downward from hook and through the slot 24 of baseplate 12.

Once the new bale 5 is long enough to continuously hold the yarn 9 under tension, the pressing finger 22 releases the yarn 9 and assumes the position shown in FIG. 6. Preferably, however, the pressing finger 22 is turned into the position of FIG. 6 only immediately prior to the operation of the binding needle 15.

In FIG. 6, the pressing finger 22 no longer overlaps with the slot 24, and a projection 25 becomes visible. Projection 25 defines a narrow passage between two wide portions of the slot 24, a forward portion 26 facing the piston 2, and a rearward portion 27, remote from the piston 2, where the hook 11 is provided.

In FIG. 6, the binding needle 15 passes through the forward portion 26 of slot 24 when introducing the second stretch of yarn into the knotter device 6. A first strand 28 of the second stretch of yarn extends like a bowstring between the tip of binding needle 15 and the front side 19 of new bale 5. Consequently, when the binding needle 15 rises through slot 24, the distance between strand 28 and the binding needle 15 increases in the plane of movement of pressing finger 22.

A second strand 29 of said second stretch of yarn is received in a peripheral groove of binding needle 15.

When the binding needle 15 has reached its topmost position, the first strand 28 is in a region of slot 24 and is seized by pressing finger 22 when the latter rotates back toward hook 11. Along the edge of projection 25, the strand 28 is guided to a position at hook 11 where strand 28 and the first stretch 10 are ready to be seized and knotted by knotter beak 20. In this stage of the operation of the knotter device 6, as shown in FIG. 7, the distance between pressing finger 22 and hook 11 is slightly greater than in the stage of FIG. 5. Consequently, the yarn is not tightly held between finger 22 and hook 11, but the two merely define a guide aperture through which stretch 10 and strand 28 extend and can be drawn when the knotter beak 20 rotates to form a knot.

The following list of reference signs of various elements mentioned above is included (as follows), for ease of explanation:

Reference Numerals 1 pressing channel
2 piston
3 feed opening
4 finished bale
5 new bale
6 knotter device
7 knotter shaft
8 clamping disk
9 yarn
10 first stretch
11 hook
12 baseplate
13 intermediate portion
14 rear side
15 binding needle
16 supply bobbin
17 layshaft
18 Axis
19 front side
20 knotter beak
21 layer
22 pressing finger or second holder
23 axis
24 slot
25 projection
26 forward portion
27 rearward portion
28 strand
29 strand As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:
1. A bale press, comprising:
a pressing channel (1) in which a piston (2) is displaceable for forming a bale (4; 5) from crop material supplied to the pressing channel (1),
a yarn supply (16), and
a knotter device (6) arranged at a side of the pressing channel (1), wherein the knotter device (6) comprises
a first holder (8) for releasably holding an end portion of a yarn (9),
a second holder (22),
a yarn deflecting member (11), and
a knotter beak (20),
wherein the yarn (9) extends between the first holder (8) and the yarn supply (16) across the deflecting member (11) and a side (14) of the bale (5) facing away from the piston (2),
wherein the knotter beak (20) ties a knot in a first stretch (10) of the yarn extending between the first holder (8) and the deflecting member (11),
wherein the second holder (22) comprises a pressing finger which in a first position presses the yarn (9) against an abutment and in a second position is spaced apart from the yarn (9) and the abutment, and
wherein the second holder (22) holds the yarn (9) at the deflecting member (11) at least in an initial phase of bale formation.

2. The bale press of claim 1, wherein the abutment is the deflecting member (11).

3. A bale press, comprising:
a pressing channel (1) in which a piston (2) is displaceable for forming a bale (4; 5) from crop material supplied to the pressing channel (1),
a yarn supply (16), and
a knotter device (6) arranged at a side of the pressing channel (1), wherein the knotter device (6) comprises:
a first holder (8) for releasably holding an end portion of a yarn (9),
a second holder (22),
a yarn deflecting member (11), and
a knotter beak (20),
wherein the yarn (9) extends between the first holder (8) and the yarn supply (16) across the deflecting member (11) and a side (14) of the bale (5) facing away from the piston (2),
wherein the knotter beak (20) ties a knot in a first stretch (10) of the yarn extending between the first holder (8) and the deflecting member (11),
wherein the second holder (22) comprises a pressing finger which in a first position presses the yarn (9) against an abutment and in a second position is spaced apart from the yarn (9) and the abutment,
wherein the second holder (22) holds the yarn (9) at the deflecting member (11) at least in an initial phase of bale formation, and
wherein the yarn (9, 13) extends straight between the deflecting member (11) and an edge of the side (14) of the bale (5) facing away from the piston (2) at least while the bale (5) is subject to pressure from the piston (2).

4. The bale press of claim 1, further comprising
a binding needle (15) which is displaceable across the pressing channel (1) so as to introduce into the knotter device (6) a second stretch (28, 29) of yarn (9) for knotting to the first stretch (10) by the knotter beak (20),
wherein the pressing finger releases the first stretch (10) of yarn (9) prior to the introduction of the second stretch (28, 29) into the knotter device (6), and urges both the first and the second stretch (10, 28) towards the abutment (11) after introduction of the second stretch (28, 29).

5. The bale press of claim 4, wherein the knotter device (6) further comprises a baseplate (12) facing the pressing channel (1), wherein a slot (24) formed in the baseplate (12) has a first portion (27) through which the yarn (9) extends from the deflecting member (11) to the side (14) of the bale (5) facing away from the piston (2), and a second portion (26) for receiving the reciprocating binding needle (15) and the second stretch (28, 29) of yarn, and wherein a projection (25) extends into the slot (24) between its first and second portions (27, 26).

\* \* \* \* \*